United States Patent
Baumann

(10) Patent No.: US 6,766,826 B2
(45) Date of Patent: Jul. 27, 2004

(54) LOW NOISE FLUID CONTROL VALVE

(75) Inventor: Hans D. Baumann, Rye, NH (US)

(73) Assignee: Fisher Controls International, Inc., Marshalltown, IA (US)

( * ) Notice: Subject to any disclaimer, the term of this patent is extended or adjusted under 35 U.S.C. 154(b) by 124 days.

(21) Appl. No.: 10/121,423

(22) Filed: Apr. 12, 2002

(65) Prior Publication Data

US 2003/0192601 A1 Oct. 16, 2003

(51) Int. Cl.[7] .............................................. F16K 47/08
(52) U.S. Cl. ................................ 137/625.3; 137/625.39
(58) Field of Search ...................... 137/625.3, 625.33, 137/625.38, 625.39

(56) References Cited

U.S. PATENT DOCUMENTS

| | | |
|---|---|---|
| 3,135,286 A | 6/1964 | Baumann |
| 3,219,310 A | 11/1965 | Baumann |
| 3,304,949 A | 2/1967 | Baumann |
| 3,776,278 A | 12/1973 | Allen |
| 3,794,063 A * | 2/1974 | Carroll et al. ......... 137/505.26 |
| 3,813,079 A * | 5/1974 | Baumann et al. ........... 251/127 |
| 3,908,698 A | 9/1975 | Baumann |
| 3,990,475 A * | 11/1976 | Myers ...................... 137/625.3 |
| 4,018,245 A | 4/1977 | Baumann |
| 4,041,973 A | 8/1977 | Rice et al. |
| 4,041,982 A * | 8/1977 | Lindner ................... 137/625.3 |
| 4,108,210 A | 8/1978 | Luthe et al. |
| 4,149,563 A * | 4/1979 | Seger ..................... 137/625.38 |
| 4,671,321 A * | 6/1987 | Paetzel et al. ........... 137/625.3 |
| 4,825,906 A * | 5/1989 | Hartman .................. 137/625.3 |
| 5,180,139 A | 1/1993 | Gethmann et al. |
| 5,193,583 A | 3/1993 | Gethmann et al. |
| 5,332,004 A | 7/1994 | Gethmann et al. |
| 5,400,825 A | 3/1995 | Gethmann et al. |
| 5,769,122 A | 6/1998 | Baumann et al. |
| 5,941,281 A | 8/1999 | Baumann et al. |
| 5,964,248 A * | 10/1999 | Enarson et al. ......... 137/625.39 |
| 6,024,122 A * | 2/2000 | Steinke ....................... 137/545 |
| 6,026,859 A | 2/2000 | Wears et al. |
| 6,095,196 A | 8/2000 | McCarty et al. |
| 6,131,612 A | 10/2000 | Beurskens |
| 6,394,134 B1 * | 5/2002 | Kwon ..................... 137/625.3 |

FOREIGN PATENT DOCUMENTS

WO    WO 00/09917 A2    2/2000

* cited by examiner

Primary Examiner—John Fox
(74) Attorney, Agent, or Firm—Wolf, Greenfield & Sacks, P.C.

(57) ABSTRACT

A fluid control valve includes a valve body having a fluid passageway, a cage mounted in the fluid passageway, the cage including a wall defining a cage bore having an axis, and a valve plug assembly including a valve plug that is axially slidable in the cage bore. The cage defines one or more windows and a valve seat. Each of the one or more windows includes a plurality of slots each having a longitudinal axis. The longitudinal axis of each of the slots is parallel to or tilted at a relatively small angle with respect to a reference plane that is perpendicular to the cage bore axis. The longitudinal axes of the slots are preferably oriented at an angle of about 0° to 15° with respect to the reference plane.

24 Claims, 6 Drawing Sheets

LOW NOISE FLUID CONTROL VALVE

FIELD OF THE INVENTION

This invention relates generally to fluid control valves and, more particularly, to fluid control valve structures which suppress the noise normally generated by fluid flow through a control valve.

BACKGROUND OF THE INVENTION

One type of prior art fluid control valve includes a valve body having inlet and outlet ports, a sleeve-like cage, a valve plug that is slidable within the cage and a bonnet assembly which retains the cage and the valve plug in the valve body. The inlet port communicates with the outlet port through apertures, or windows, in the cage. Fluid flow through the valve is determined by the position of the valve plug relative to the windows of the cage. A valve stem attached to the valve plug extends through the bonnet assembly to an actuator for moving the valve plug relative to the cage. An example of a prior art fluid control valve is disclosed in U.S. Pat. No. 3,776,278, issued Dec. 4, 1973 to Allen. Additional fluid control valves are disclosed U.S. Pat. No. 5,769,122, issued Jun. 23, 1998 to Baumann et al; U.S. Pat. No. 5,941,281, issued Aug. 24, 1999 to Baumann et al; and U.S. Pat. No. 6,095,196, issued Aug. 1, 2000 to McCarty et al.

Prior art fluid control valves have provided satisfactory performance but have certain drawbacks. The valve may generate undesirable noise under certain flow conditions, such as a high pressure drop through the valve. U.S. Pat. No. 3,776,278 discloses a valve structure for reducing noise in gas applications. In one embodiment, the cage is provided with slots having long dimensions parallel to the cage bore axis. The slots have their narrowest dimension intermediate their ends and taper or flare gradually to a wider dimension at the inner and outer surfaces. In another embodiment, the cage has closely-spaced, uniformly-distributed circular holes.

The disclosed valve structures reduce noise generation, but noise may continue to be a problem under certain operating conditions. Furthermore, the disclosed valve is designed for use only with gases. Accordingly, there is a need for valve structures for use with liquids and gases, which exhibit further reductions in noise generation and which have desirable flow characteristics.

SUMMARY OF THE INVENTION

According to a first aspect of the invention, a fluid control valve is provided. The fluid control valve comprises a valve body having a fluid passageway, a cage mounted in the fluid passageway, the cage including a wall defining a cage bore having an axis, and a valve plug assembly comprising a valve plug that is axially slidable in the cage bore. The cage defines one or more windows and a valve seat. Each of the one or more windows comprises a plurality of slots each having a longitudinal axis, wherein the longitudinal axis of each of the slots in parallel to or tilted at a relatively small angle with respect to a reference plane that is perpendicular to the cage bore axis and wherein the slots are axially spaced apart.

The longitudinal axes of the slots may be oriented at an angle in a range of about 0° to 15° with respect to the reference plane. In some embodiments, the slots are tilted at an angle of about 4° with respect to the reference plane. In other embodiments, the slots are oriented parallel to the reference plane. In further embodiments, the slots in adjacent windows are tilted in opposite directions with respect to the reference plane. The slots may be tilted at an angle with respect to the reference plane to provide a relatively smooth flow progression between adjacent slots as a function of valve plug position along the cage bore axis.

Two or more of the slots may have different lengths to provide a desired flow characteristic. In some embodiments, the slots are relatively short in a portion of the cage adjacent to the valve seat and are relatively long in a portion of the cage spaced from the valve seat.

The slots may be tapered in width through the wall of the cage. Preferably, the slots increase in width with increasing radius through the wall of the cage. The slots may be tapered in width through the wall of the cage at an angle in a range of about 4° to 17°.

The slots in the cage may be configured for low noise liquid flow toward the cage bore axis and for low noise gas flow away from the cage bore axis. For liquid applications, the valve plug preferably has a relatively small radial wall thickness in proximity to a seating surface in order to limit exposure of the valve plug to imploding jets when liquid flow into the cage is undergoing cavitation.

In one embodiment, the cage defines a sealing lip in the cage bore located above the windows, and the valve plug includes one or more pressure balancing passages between opposite ends thereof. The valve plug assembly further comprises an elastomer ring for engaging the sealing lip when the valve plug is in a closed position.

In another embodiment, the cage defines a sealing lip located in the cage bore above the windows, and the valve plug includes one or more pressure balancing passages between opposite ends thereof. The valve plug assembly further comprises a deformable sealing ring for engaging a sealing lip when the valve plug is in a closed position.

According to another aspect of the invention, a valve cage is provided for mounting in a fluid passageway of a fluid control valve. The valve cage comprises a generally cylindrical wall defining a cage bore having a axis. The wall defines one or more windows and a valve seat. Each window comprises a plurality of slots, each having a longitudinal axis. The longitudinal axis of each of the slots is parallel to or tilted at a relatively small angle with respect to a reference plane that is perpendicular to the cage bore axis.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
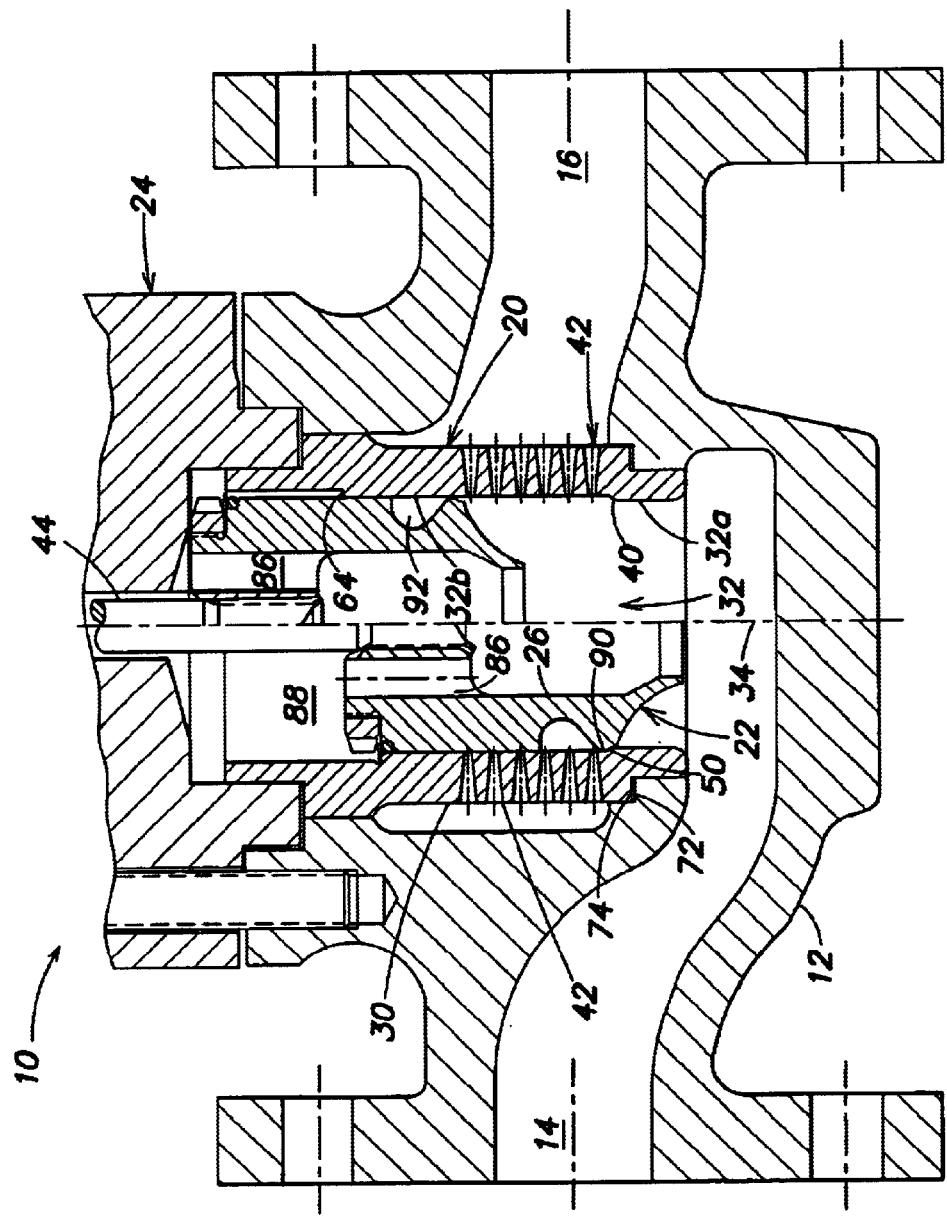
FIG. 1 is a cross-sectional view of a fluid control valve in accordance with a first embodiment of the invention, with the valve plug split along its axis such that the left half of the valve plug is shown in the closed position and the right half of the valve plug is shown in the open position.

A fluid control valve in accordance with a first embodiment of the invention is shown in FIG. 1. A control valve 10 includes a valve body 12 having an inlet port 14 and an outlet port 16, a cage 20, a valve plug assembly 22 and a bonnet assembly 24. A major component of valve plug assembly 22 is a valve plug 26.

The cage 20 is a sleeve-like structure having a generally cylindrical wall 30 which defines a cage bore 32 having an axis 34. Cage bore 32 has a lower section 32a with a first diameter, a middle section 32b with a second diameter that is larger than the first diameter and an upper section 32c with a third diameter that is larger than the first and second diameters. Cage 20 defines a valve seat 40 and one or more apertures, or windows 42. Windows 42 provide flow passages between cage bore 32 and the exterior of cage 20.

A valve stem 44 attached to valve plug 26 extends through bonnet assembly 24 to an actuator (not shown). The valve plug assembly 22 is slidable along axis 34 within the middle section 32b of cage bore 32 between an open position, shown on the right of axis 34 in FIG. 1, and a closed position, shown on the left of axis 34 in FIG. 1. In the closed position, a seating surface 50 of valve plug 26 engages valve seat 40, thereby blocking fluid flow through the control valve. In the open position, valve plug assembly 22 is moved along axis 34 to a position above windows 42 in cage 20. In the open position, the inlet port 14 communicates with the outlet port 16 through cage bore 32 and windows 42. The valve plug assembly 22 may be located at any intermediate position between the open and closed positions to achieve a desired rate of flow.

A cage and a valve plug assembly in accordance with the first embodiment of the invention are shown in FIGS. 2–5. Like elements in FIGS. 1–5 have the same reference numerals.

Figure 4:
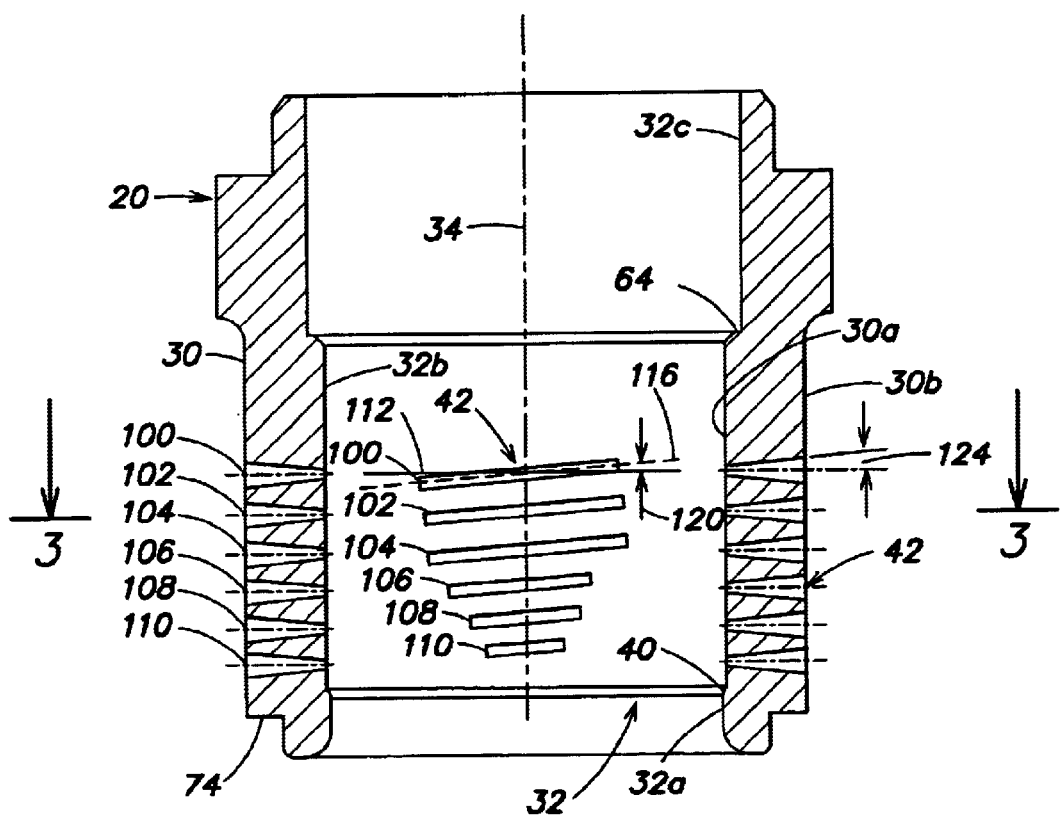
FIG. 4 is a cross-sectional view of the cage, with the valve plug assembly removed.

Windows 42 may have a configuration as best shown in FIG. 4. As shown, each window 42 may include a plurality of slots 100, 102, 104, 106, 108 and 110. It is useful to define a reference plane 112 that is perpendicular to the cage bore axis 34. Each of the slots has a longitudinal axis 116 that is oriented parallel to or tilted at a relatively small angle 120 with respect to reference plane 112. Preferably, the angle between the longitudinal axes 116 of slots 100–110 and reference plane 112 is in a range of about 0° to 15°. In one embodiment, angle 120 has a value of 4°. The tilting of slots 100–110 with respect to reference plane 112 provides a relatively smooth flow progression between adjacent slots as a function of valve plug position. In another embodiment, slots 100–110 are parallel to reference plane 112 and angle 120 is 0°. The case where slots 100–110 are parallel to reference plane 112 provides a more abrupt flow progression between adjacent slots as a function of valve plug position. Preferably, the slots in each window are parallel to each other.

As further shown in FIG. 4, slots 100–110 may have different lengths to achieve a desired flow characteristic as a function of valve plug position. In the embodiment of FIG. 4, slots 110, 108, 106 and 104 have progressively greater lengths, with the slot length increasing with distance from valve seat 40, and slots 100, 102 and 104 have equal lengths. It will be understood that the flow for any valve plug position is determined by the number of exposed slots and the dimensions of the exposed slots. Thus, the slot lengths may be selected to provide a desired flow characteristic as a function of valve plug position along the cage bore axis 34. One example is an equal percent change as a function of valve plug position. The lengths of the slots may be all equal, all different, or a combination of some equal and some different.

Typically, slots 100–110 have widths at the inside surface of cylindrical wall 30 in a range of about 1% to 5% of diameter 32b. As further shown in FIG. 4, slots 100–110 may be tapered in width from an inside surface 30a to an outside surface 30b of cylindrical wall 30. In particular, slots 100–110 are tapered in width from relatively narrow at inside surface 30a to relatively wide at outside surface 30b. Preferably, slots 100–110 are tapered at a half angle 124 in a range of about 2° to 8.5°. In one embodiment, half angle 124 has a value of 6°. This configuration has desirable flow characteristics for both gases and liquids, as described below. Cylindrical wall 30 may have a radial thickness in a range of 20% to 30% of diameter 32b.

It will be understood that the number of slots in each window, the dimensions of the individual slots and the angle 120 between the slots and the reference plane 112 may be varied within the scope of the present invention. Furthermore, the taper in the width of the slots through the wall 30 may be varied within the scope of the invention.

Cage 20 may include a sealing lip 64 located above windows 42. Sealing lip 64 is defined by a change in diameter of cage bore 32. In particular, cage bore 32 has a diameter in a middle section 32b between valve seat 40 and sealing lip 64 that is slightly larger than the maximum diameter of valve plug 26. Above sealing lip 64, upper section 32c of cage bore 32 has a larger diameter, sufficient to provide clearance for a deformable sealing ring on valve plug assembly 22, as described below.

As shown in FIG. 1, valve body 12 is provided with a shoulder 72 that engages a corresponding shoulder 74 on cage 20. Cage 20 is retained within the valve body 12 by bonnet assembly 24. When bonnet assembly 24 is installed on valve body 12, cage 20 is retained in a fixed position by the opposing forces exerted by shoulder 72 and bonnet assembly 24.

As noted above, valve plug 26 is provided with a seating surface 50 for engaging valve seat 40 in the closed position of valve plug 22. Seating surface 50 and valve seat 40 may have matching angles of about 30° to insure a fluid-tight seal.

Valve plug 26 is further provided with one or more pressure-balancing passages 86 between upper and lower ends thereof. A fluid within the valve moves through passages 86 to a region 88 above valve plug 26, thereby balancing the pressure on opposite ends of valve plug 26 and aiding in the deflection of a sealing ring against sealing lip 64.

Valve plug 26 includes a short cylindrical section 90 above seating surface 50, followed by an annular expansion groove 92. Cylindrical section 90 has a diameter that is slightly smaller than the diameter of cage bore 32 in middle section 32b. The configuration of cylindrical section 90 followed by expansion groove 92 permits rapid jet expansion, maximum turbulence and low pressure recovery for reduced noise in low flow conditions.

Figure 5:
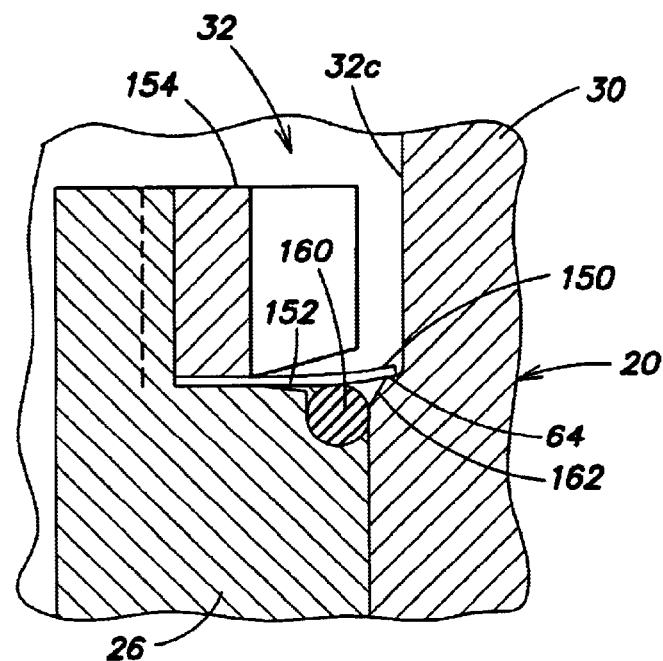
FIG. 5 is an enlarged, partial cross-sectional view of the cage and the valve plug assembly, illustrating the sealing lip of the cage and the deformable sealing ring of the valve plug assembly.

Valve plug assembly 22 further includes an elastically deformable sealing ring 150, as best shown in FIG. 5, held on a shoulder 152 at the upper end of valve plug 26 by a threaded retainer 154. Sealing ring 150, which may be a metal such as a high nickel alloy, is selected for high tensile strength at high temperatures. Sealing ring 150 has an outside diameter that is larger than the maximum diameter of valve plug 26 but is smaller than the inside diameter of upper section 32c of cage bore 32 above sealing lip 64. As a result, sealing ring 150 does not contact cage 20, except at sealing lip 64. The valve plug 26 may be provided with a groove for an elastomer ring 160 located below sealing ring 150. Elastomer ring 160 maybe utilized in applications involving temperatures below about 450° F. Elastomer ring 160 also has an outside diameter that is less than the inside diameter of upper section 32c of cage bore 32 above sealing lip 64.

In operation, valve plug assembly 22 moves axially within cage bore 32 without seal friction until valve plug 22 is near the closed position. Before seating surface 50 engages valve seat 40, sealing ring 150 engages sealing lip 64 of cage 20 and is slightly deformed as valve plug assembly 22 moves to the fully closed position. In addition, elastomer ring 160 engages a beveled portion 162 of sealing lip 64 and is slightly deformed. Thus, sealing ring 150 and elastomer ring 160 provide a reliable seal between region 88 above valve plug 22 and windows 42 when valve plug assembly 22 is in the closed position. In the open and partially open positions of valve plug assembly 22, sealing ring 150 and elastomer ring 160 do not contact cage 20, and movement of valve plug 26 is substantially free of sliding seal friction.

Figure 2:
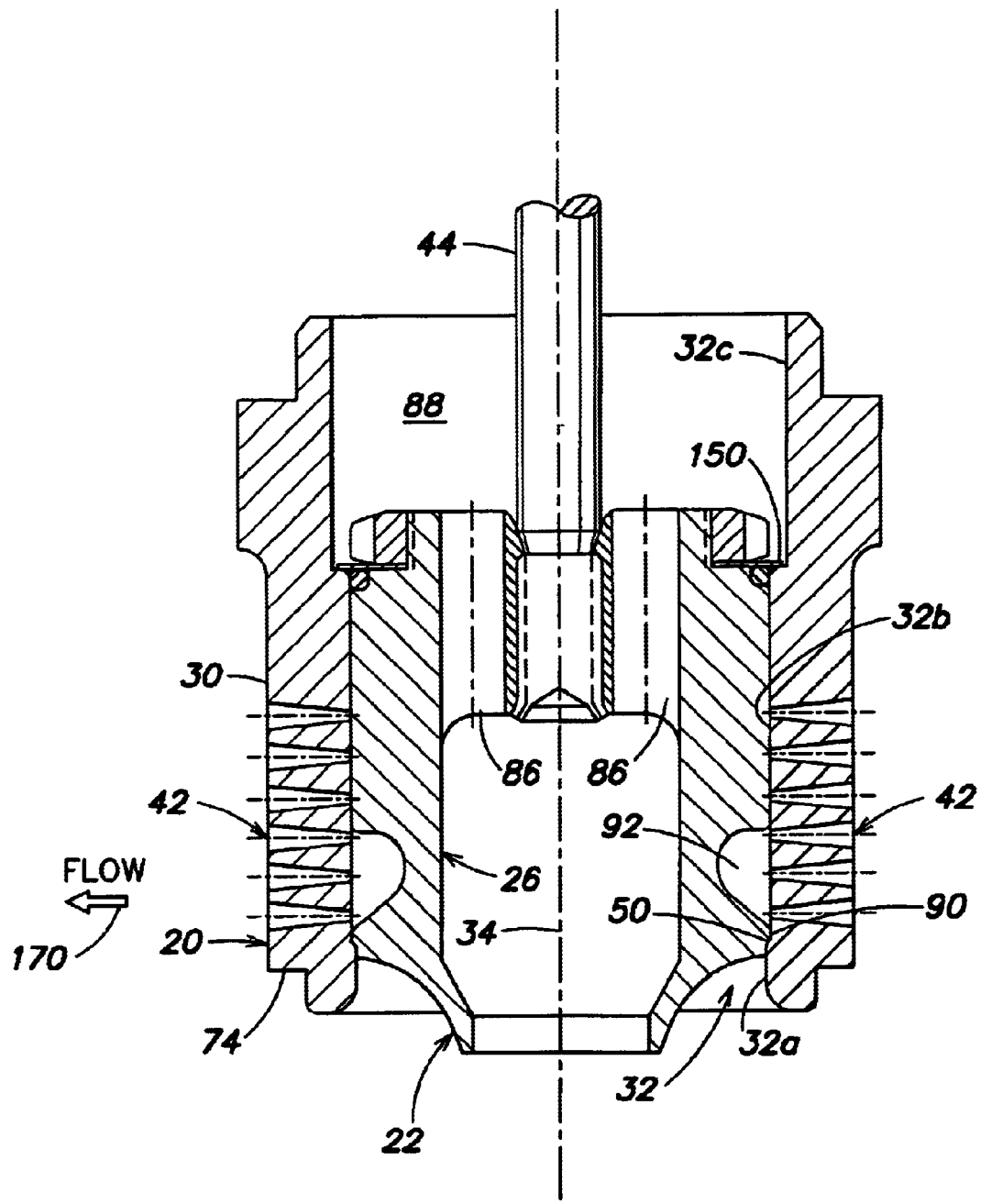
FIG. 2 is a cross-sectional view of a cage and a valve plug assembly in accordance with the first embodiment of the invention, with the valve plug assembly in a closed position, wherein the valve plug assembly is configured for operation with a gas.
Figure 3:
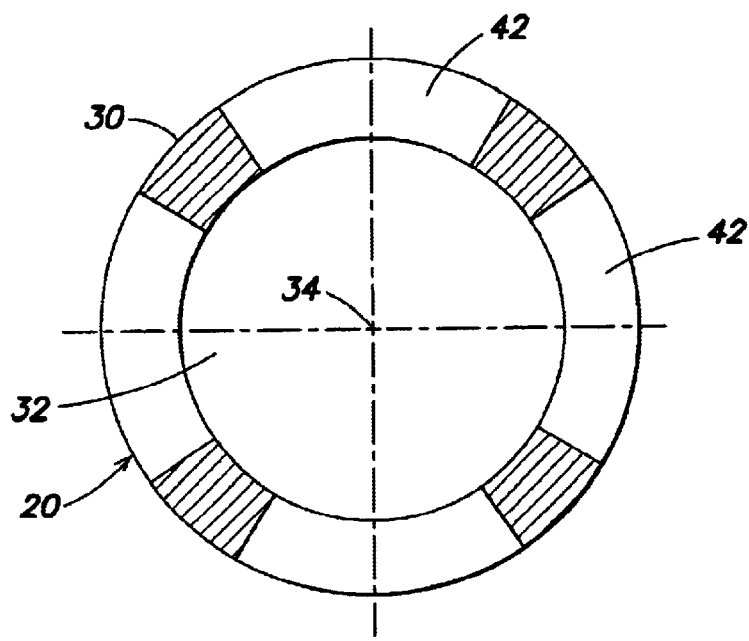
FIG. 3 is a cross-sectional top view of the cage, taken along the line 3—3 of FIG. 4.

The configuration of cage 20 and valve plug assembly 22 shown in FIGS. 2 and 5 is best suited for gas control applications. In gas control applications, the direction of flow is radially outwardly with respect to cage bore axis 34, as indicated by arrow 170 in FIG. 2. The configuration of slots 100–110 in cage 20, wherein the width of the slots is tapered through cylindrical wall 30, produces an expanding jet downstream of the contraction at the inlet to each of slots 100–110. The walls of slots 100–110 act as hypersonic nozzles wherein the kinetic energy of the gas is absorbed by shock waves rather than turbulence. Supersonic flow in the slots collapses into shock waves which reduce pressure and produce less noise than turbulence.

Figure 6:
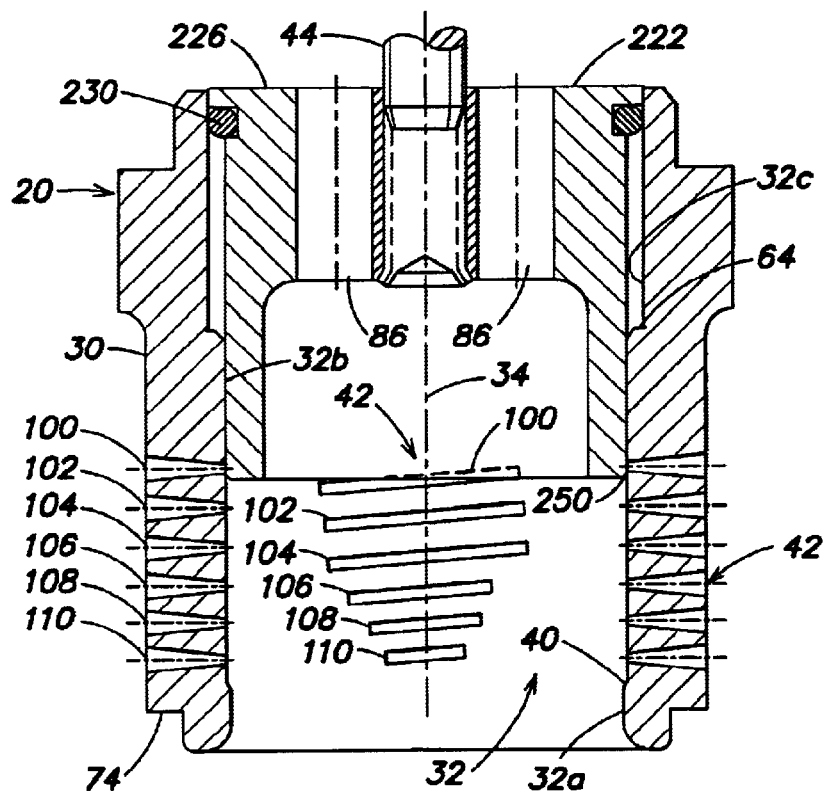
FIG. 6 is a cross-sectional view of a cage and a valve plug assembly in accordance with a second embodiment of the invention, with the valve plug assembly in an open position, wherein the valve plug assembly is configured for liquid control applications.
Figure 7:
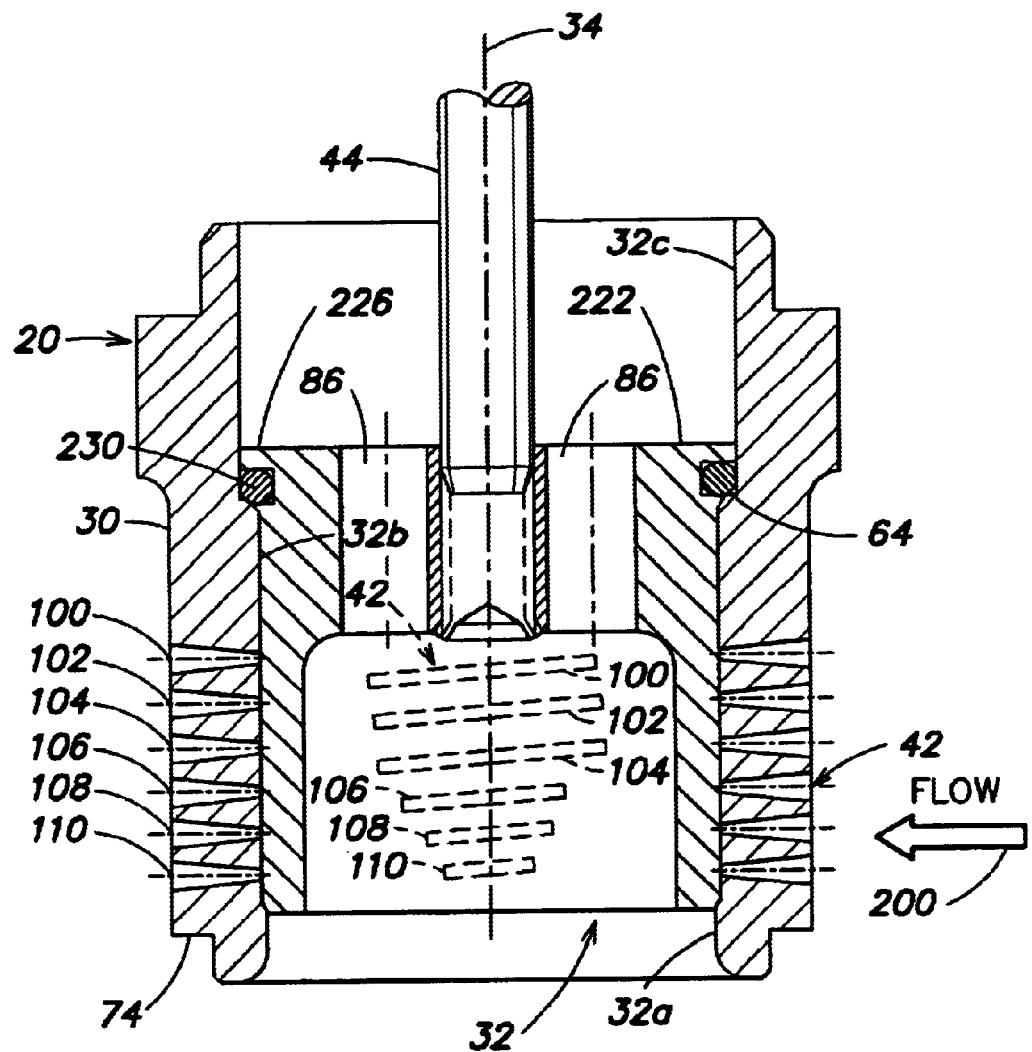
FIG. 7 is a cross-sectional view of the cage and the valve plug assembly of FIG. 6, with the valve plug assembly in the closed position.

A second embodiment of a cage and a valve plug assembly in accordance with the invention is shown in FIGS. 6 and 7. Like elements in FIGS. 1–7 have the same reference numerals. The embodiment of FIGS. 6 and 7 is configured for liquid control applications. In liquid control applications, the flow direction is toward cage bore axis 34, as indicated by arrow 200 in FIG. 7.

The embodiment of FIGS. 6 and 7 utilizes cage 20 having one or more windows 42, each having slots 100–110, as described above. A valve plug assembly 222 includes a valve plug 226 and an elastomer ring 230 mounted in a groove near the upper end of valve plug 226. Elastomer ring 230 engages sealing lip 64 near the closed position of valve plug 226 to insure that the upper end of the valve plug is sealed in liquid applications. Valve plug 226 is provided with a seating surface 250 for engaging valve seat 40 of cage 20 in the closed position of the valve, as shown in FIG. 7. Preferably, the lower end of valve plug 226 terminates just below seating surface 250.

As noted above, the liquid flow direction is radially inwardly toward cage bore axis 34. The tapered widths of slots 100–110 in windows 42 causes the flow through cage 20 to accelerate and to reach the highest velocity at the inside surface of cylindrical wall 30. This may cause the static pressure at that point to reach the vapor pressure of the liquid and consequently force partial vaporization of the jets. This vapor then collapses into liquid flow within cage bore 32. By configuring valve plug 226 such that the lower end of valve plug 226 is located just below seating surface 250 and has a radial thickness of less than three times the width of slots 100–110, contact between the collapsing jets and valve plug 226 is minimized, and damage to valve plug 226 is limited.

Figure 8:
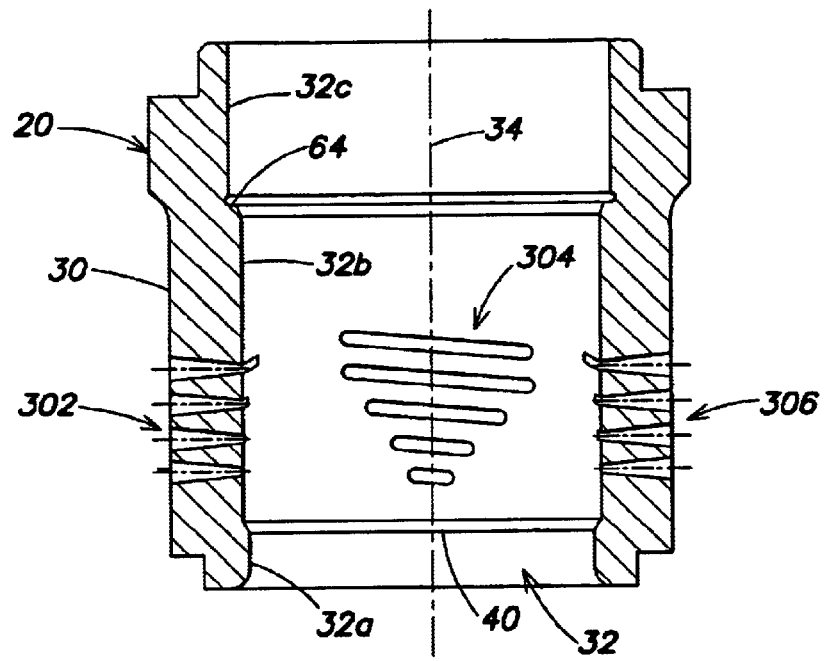
FIG. 8 is a cross-sectional view of a cage in accordance with a third embodiment of the invention.
Figure 9:
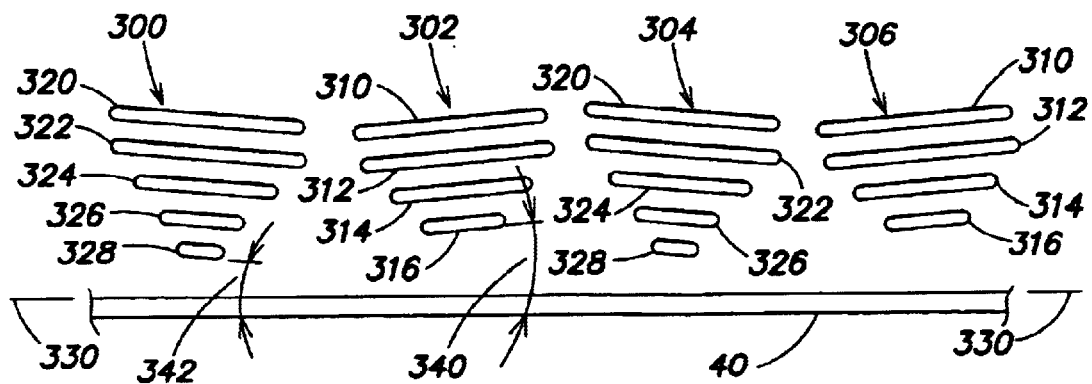
FIG. 9 illustrates the window configuration in the cage of FIG. 8.

A third embodiment of a cage in accordance with the invention is shown in FIGS. 8 and 9. Like elements in FIGS. 1–9 have the same reference numerals. The embodiment of FIGS. 8 and 9 utilizes cage 20 having windows 300, 302, 304 and 306 with different slot configurations. FIG. 9 represents the window configuration as it would appear if cylindrical cage 20 was cut axially and flattened. Thus, windows 300, 302, 304 and 306, shown on a flat surface in FIG. 9, are azimuthally spaced apart from each other by 90° in cage 20. As shown in FIG. 9, windows 302 and 306 each include slots 310, 312, 314 and 316. Windows 300 and 304 each include slots 320, 322, 324, 326 and 328. As further shown in FIG. 9, a reference plane 330 may be defined parallel to seating surface 40 and perpendicular to cage bore axis 34. It may be observed that slots 310, 312, 314 and 316 in windows 302 and 306 are tilted at a relatively small positive angle 340 with respect to reference plane 330, whereas slots 320, 322, 324, 326 and 328 in windows 300 and 304 are tilted at a relatively small negative angle 342 with respect to reference plane 330. This configuration, with opposite tilts of the slots in adjacent windows, has the advantage of reducing the tendency for formation of a vortex within cage bore 32 in the case of liquid flow. The tilt angles of adjacent windows thus are in opposite directions with respect to reference plane 330. The tilt angles of adjacent windows may be of equal magnitudes or different magnitudes. FIG. 9 also illustrates the case where the windows in cage 20 have different numbers of slots.

The valve structures have been described above in connection with the valve orientation of FIG. 1. Thus, valve seat 40 is described as located "below" windows 42, and sealing lip 64 is described as located "above" windows 42. It will be understood that the control valve may have any desired orientation in use and that the relative positions of the valve elements will change. In addition, it will be understood that the valve features described herein may be utilized separately or in combination to achieve high performance valve operation.

Different valve plug configurations may be utilized with the low noise cage structure described herein. For example, a valve plug that does not have pressure balancing passages may be utilized.

It should be understood that various changes and modifications of the embodiments shown in the drawings described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A fluid control valve comprising:
   a valve body having a fluid passageway;
   a cage mounted in said fluid passageway, said cage including a wall defining a cage bore having an axis, said cage defining one or more windows and a valve seat, each of said one or more windows comprising a plurality of slots each having a longitudinal axis, wherein the longitudinal axis of each of said slots is parallel to or tilted at a relatively small angle with respect to a reference plane that is perpendicular to the cage bore axis, said slots being axially spaced apart, wherein said slots in adjacent windows are tilted in opposite directions with respect to said reference plane; and
   a valve plug assembly comprising a valve plug that is axially slidable in the cage bore.

2. A fluid control valve as defined in claim 1, wherein the longitudinal axes of said slots are oriented at an angle in a range of about 0° to 15° with respect to the reference plane.

3. A fluid control valve as defined in claim 1, wherein the longitudinal axes of said slots are tilted at an angle of about 4° with respect to the reference plane.

4. A fluid control valve as defined in claim 1, wherein the slots of each window are parallel to each other.

5. A fluid control valve as defined in claim 1, wherein two or more of said slots have different lengths.

6. A fluid control valve as defined in claim 1, wherein said slots are relatively short in a portion of said cage adjacent to the valve seat and are relatively long in a portion of said cage spaced from said valve seat.

7. A fluid control valve as defined in claim 1, wherein said slots have a width at an inside surface of the wall in a range of about 1% to 5% of the diameter of said cage bore.

8. A fluid control valve as defined in claim 1, wherein said slots are tilted at an angle with respect to the reference plane to provide a relatively smooth flow progression between adjacent slots as a function of valve plug position along the cage bore axis.

9. A fluid control valve as defined in claim 1, wherein said slots are tapered in width through the wall of said cage.

10. A fluid control valve as defined in claim 1, wherein said slots increase in width with increasing radius through the wall of said cage.

11. A fluid control valve as defined in claim 10, wherein said slots are tapered in width through the wall of said cage at an angle in a range of about 4° to 17°.

12. A fluid control valve as defined in claim 1, wherein said slots are configured for low noise liquid flow toward said cage bore axis and for low noise gas flow away from said cage bore axis.

13. A fluid control valve as defined in claim 1, wherein said slots are configured for an equal percent flow characteristic as a function of valve plug position.

14. A fluid control valve as defined in claim 1, wherein said valve plug has a seating surface for engaging the valve seat of said cage, and wherein the radial thickness of said valve plug in close proximity to said valve seat is configured to limit exposure of the valve plug to imploding jets when liquid flow into the cage is undergoing cavitation.

15. A fluid control valve as defined in claim 1, wherein the radial thickness of said valve plug is less than three times the width of said slots.

16. A fluid control valve as defined in claim 1, wherein said cage defines a sealing lip in the cage bore located above said one or more windows and wherein said valve plug includes one or more pressure balancing passages between opposite ends thereof, said valve plug assembly further comprising an elastomer ring for engaging the sealing lip when the valve plug is in a closed position.

17. A fluid control valve as defined in claim 1, wherein said cage defines a sealing lip located in the cage bore above said one or more windows and wherein said valve plug assembly further comprises a deformable sealing ring for engaging the sealing lip when the valve plug is in a closed position.

18. A valve cage for mounting in a fluid passageway of a fluid control valve, comprising:
    a generally cylindrical wall defining a cage bore having an axis, said wall defining at least one window and a valve seat, said at least one window comprising a plurality of slots each having a longitudinal axis, wherein the longitudinal axis of each of said slots is parallel to or tilted at a relatively small angle with respect to a reference plane that is perpendicular to the cage bore axis, said slots being axially spaced apart, wherein said slots in adjacent windows are tilted in opposite directions with respect to said reference plane.

19. A valve cage as defined in claim 18, wherein the longitudinal axes of said slots are oriented at an angle in a range of about 0° to 15° with respect to the reference plane.

20. A valve cage as defined in claim 18, wherein two or more of said slots have different lengths.

21. A valve cage as defined in claim 18, wherein said slots are relatively short in a portion of said cage adjacent to said valve seat and are relatively long in a portion of said cage spaced from said valve seat.

22. A valve cage as defined in claim 18, wherein said slots are tapered in width through the wall of said cage.

23. A valve cage as defined in claim 18, wherein said slots increase in width with increasing radius through the wall of said cage.

24. A fluid control valve as defined in claim 23, wherein said slots are tapered in width through the wall of said cage at angles in a range of about 4° to 17°.

* * * * *

UNITED STATES PATENT AND TRADEMARK OFFICE
CERTIFICATE OF CORRECTION

PATENT NO. : 6,766,826 B2
DATED : July 27, 2004
INVENTOR(S) : Hans D. Baumann

It is certified that error appears in the above-identified patent and that said Letters Patent is hereby corrected as shown below:

Column 8,
Line 7, "claim 1" should be replaced by -- claim 14 --.

Signed and Sealed this

First Day of February, 2005

JON W. DUDAS
*Director of the United States Patent and Trademark Office*